United States Patent [19]

Lowe et al.

[11] Patent Number: 5,773,587
[45] Date of Patent: Jun. 30, 1998

[54] HYDROPHLIC POLYMER COATED PERFLUROCARBON POLYMER MATRICES FOR BIOAFFINITY SEPARATIONS

[75] Inventors: Christopher Robin Lowe, Hempstead, United Kingdom; Norman A Parris, Hockessin, Del.; Ian Pitfield, Dorset; Duncan Ross Purvis, Cambridgeshire, both of United Kingdom

[73] Assignee: DVC, Inc., Wilmington, Del.

[21] Appl. No.: 689,160

[22] Filed: Aug. 6, 1996

Related U.S. Application Data

[63] Continuation of Ser. No. 311,840, Sep. 23, 1994, abandoned, which is a continuation of Ser. No. 52,308, Apr. 22, 1993, abandoned.

[51] Int. Cl.$^6$ .............................. C07K 17/08; C07K 1/22; C12N 11/08; G01N 33/545
[52] U.S. Cl. ........................ 530/413; 436/531; 436/532; 435/180; 435/181; 435/815; 530/815; 530/816
[58] Field of Search ..................................... 435/175, 180, 435/181, 815; 436/531, 532; 530/413, 815, 816

[56] References Cited

U.S. PATENT DOCUMENTS

| | | | |
|---|---|---|---|
| 3,843,443 | 10/1974 | Fishman | 195/63 |
| 4,113,912 | 9/1978 | Okita | 428/290 |
| 4,229,537 | 10/1980 | Hodgins et al. | 435/177 |
| 4,352,884 | 10/1982 | Nakashima et al. | 435/180 |
| 4,619,897 | 10/1986 | Hato et al. | 435/182 |
| 4,693,985 | 9/1987 | Degen et al. | 435/180 X |
| 4,778,767 | 10/1988 | Hummelen et al. | 436/531 |
| 4,885,250 | 12/1989 | Eveleigh et al. | 435/181 |
| 4,954,444 | 9/1990 | Eveleigh et al. | 435/181 |
| 5,030,352 | 7/1991 | Varady et al. | 210/502.1 |
| 5,144,013 | 9/1992 | Sakamoto | 530/415 |
| 5,243,037 | 9/1993 | Arentzen et al. | 435/181 X |
| 5,270,193 | 12/1993 | Eveleigh | 435/181 |

FOREIGN PATENT DOCUMENTS

| | | |
|---|---|---|
| 0 011 504 | 11/1979 | European Pat. Off. . |
| 0295073 | 6/1988 | European Pat. Off. . |
| 0408378 | 7/1990 | European Pat. Off. . |
| 2 361 439 | 10/1977 | France . |
| 64-38448 | 2/1989 | Japan . |

OTHER PUBLICATIONS

Siergiej, Dissertation Abstracts Int., vol. 44, No. 1 1983, Utilization of Fluorocarbon Polymers and Immobilized Enzymes for Liquid Chromatography.

Zhujun et al, Poly(vinyl alcohol) as a Substrate for Indicator Immobilization for Fiber–Optic Chemical Sensors, Anal. Chem. 1989, 61, pp. 202–205.

McCreath et al., Journal of Chrom. 597 (1992) pp. 189–196, Novel affinity separation based on perfluorocarbon emulsions.

Journal of Chromatography, vol. 510 (1990) pp. 177–187, "Affinity Chromatography on Novel Perfluorocarbon Supports", Stewart et al.

*Primary Examiner*—David M. Naff

[57] ABSTRACT

Perfluorocarbon polymer-based matrices are coated with a hydrophilic polymer for use in bioaffinity separations. Coating is carried out by dispersing porous particles of inert perfluorocarbon polymer in a water-miscible organic solvent such as acetone or tetrafydrofuran to wet surfaces of the particles, forming a dispersion of the wetted particles in an aqueous solution of hydrophilic polymer such as poly(vinyl alcohol) containing a plurality of hydroxyl groups, at least one being at an end of a polymer chain, to adsorb the hydrophilic polymer onto the wetted surfaces of the particles, admixing a homobifunctional cross-linking agent such as glutaraldehyde with the particles to cross-link the hydrophilic polymer, activating hydroxyl groups on the surface of the cross-linked hydrophilic polymer and covalently bonding a ligand or ligand binder to the activated hydroxyl groups.

6 Claims, 5 Drawing Sheets

HYDROPHLIC POLYMER COATED PERFLUROCARBON POLYMER MATRICES FOR BIOAFFINITY SEPARATIONS

This application is a continuation of application Ser. No. 08/311,840, filed Sep. 23, 1994, now abandoned, which is a continuation of application Ser. No. 08/052,308, filed Apr. 22, 1993, now abandoned.

FIELD OF THE INVENTION

This invention relates to inert solid supports exhibiting low nonspecific binding, and more specifically to perfluorocarbon polymer-based matrices having a coating of a crosslinked hydrophilic polymer such as polyvinyl alcohol. Solid affinity supports prepared using such hydrophilic polymer coated perfluorocarbon polymer-based supports and their use in affinity separations are also provided.

BACKGROUND ART

Laboratory and process operations in biotechnology, such as membrane and chromatographic separations, must frequently be carried out under conditions which resemble the natural environment of a host organism. Ionic strength, pH and temperature are often selected to mimic the in-vivo domain. To insure maximum stability of biomolecules, exposed surfaces in process and laboratory apparatus should be very polar or hydrophilic in order to avoid inactivation and/or adsorption of biomolecules such as nucleic acids, and proteins, including enzymes. Adsorption of biomolecules onto exposed surfaces is highly undesirable in that the process can be irreversible and/or lead to a loss in biological activity.

Although wetting agents such as surfactants and water miscible organic solvents will typically reduce adsorption, the effect is generally temporary, particularly where the surface is exposed to air. Further, the presence of these agents in solution can lead to foaming and negatively impact biological activity by disturbing the tertiary structure of proteins.

To avoid hydrophobic adsorption, many practitioners select hydrophilic materials as supports for membranes or chromatographic processes. Materials such as cellulose, acrylamide, polyethyleneimine and agarose are widely used for this reason. Although possessing the desired low level of hydrophobic character, these naturally hydrophilic substances can be deficient in other ways. For example, many of these hydrophilic substances exhibit low, but finite, solubility in aqueous solutions. This is a concern in most biological process operations which generally utilize large volumes of aqueous fluids. Such solubilization leads to both physical breakdown of the support matrix and additionally, the potential for contamination of the end product by the foreign materials released from the support matrix. The presence of such contaminants in therapeutic agents is a major concern in commercial biotechnology as they may cause fever or initiate an unexpected immune response in the patient.

In addition, many hydrophilic materials also exhibit limited thermal and chemical stability, thus interfering with their use in procedures for sterilization and endotoxin removal.

In contrast, matrices possessing the best thermal, biological and chemical resistance tend to be hydrophobic. Typical examples of hydrophobic materials include polyethylene, polytetrafluoroethylene, refractory alumina and glass. While these materials generally possess good thermal and chemical stability, they are of limited use in biotechnology operations due to undesirable adsorption and nonspecific binding of biomolecules to their surfaces.

Affinity separations are generally considered to require the use of solid carriers derivatized with a ligand or binder. Affinity chromatography is well known and has been reviewed, for example, in C. R. Lowe, "An Introduction to Affinity Chromatography, North holland Publishing Company, Amsterdam, N.Y., 1978. The list of support materials suitable for affinity chromatography is extensive and will not be reviewed here (see Lowe, 1978, for a partial listing).

Fluorocarbon polymers have been used as carriers to which ligands have been attached by adsorption [U.S. Pat. No. 3,843,443 issued to Fishman on Oct. 22, 1974; WO 8603 840 A filed by Rijsk Univ. Groningen; and Siergiej, Dissertation Abstracts, It. B., Volume 44, 153 (1983)].

Sakagani et al. [EP 0,011,504, published Jul. 20, 1983], disclose the use of electrodeposition to attach ligands to fluoropolymer ion-exchange membranes.

U.S. Pat. No. 4,885,250 issued to Eveleigh et al. on Dec. 5, 1989 discloses a solid support based on an inert perfluorocarbon polymer carrier with perfluorocarbon-substituted ligands or binders attached to its surface. U.S. Pat. No. 4,954,444 issued to Eveleigh et al. on Sep. 4, 1990 disclose a solid support based on an inert perfluorocarbon polymer carrier with ligands or binders for the ligands attached to its surface through a highly fluorinated isocyanate group.

Hato et al. (U.S. Pat. No. 4,619,897, issued Oct. 23, 1986) disclose the immobilization of enzymes onto a fluorine resin membrane which is made hydrophilic on one side by the penetration of a perfluoralkyl surface active agent to a prescribed depth. The asymmetrically functional membrane thus obtained is then treated with an enzyme and a crosslinking agent such as glutaraldehyde to achieve enzyme immobilization.

Zhujun et al., Analyt. Chem., vol 61, pp. 202–205, (1989) disclose the use of glutaraldehyde to crosslink immobilized polyvinyl alcohol on a fiber optic.

Murakami (Unexamined Patent Application Publ. [Kokai] No.: 64–38,448, laid open to the public on Feb. 8, 1989) discloses a method for impregnating the pores of a fluoroplastic polymer with a hydrophilic polymer and then crosslinking the hydrophilic polymer by irradiation with ultraviolet rays.

Mcreath et al., J. of Chromatography, 597, pp. 189–196, (1992) disclose a liquid perfluorocarbon emulsion generated by homogenization of a saturated perfluorocarbon oil with a polymeric fluorosurfactant based on polyvinyl alcohol previously derivatized with triazine dye Colour Index reactive Blue 4.

There is a need for a wettable, hydrophilic, inert, solid perfluorocarbon polymer-based support having low nonspecific binding which can be used in various biotechnology operations such as membrane and chromatographic separations.

SUMMARY OF THE INVENTION

Many of the disadvantages of the prior art are overcome by the support matrix of this invention. The greatest advantages of using wettable hydrophilic polymer coated perfluorocarbon-based polymer matrices relate to the inertness and rigidity of its perfluorocarbon carrier while at the same time, providing for a hydrophilic surface which minimizes adsorption and nonspecific binding of substances of biological interest such as ligands or binders for ligands. The support matrix of this invention is thus suitable for use in various biotechnology operations and apparatus such as for example, support or separation membranes, affinity chromatography supports, ion exchange separations, and enzyme or cellular supports. Furthermore, the crosslinked hydrophilic polymer coated perfluorocarbon polymer-based matrix of this invention can be used alone to minimize nonspecific binding of biological molecules, or, can be activated to covalently bind to biologically active molecules or other molecules of biological interest, such as for example, ligands or binders for ligands.

This invention relates to a solid hydrophilic perfluorocarbon polymer-based matrix comprising:
  (a) a chemically inert solid perfluorocarbon polymer carrier; and
  (b) a crosslinked hydrophilic polymer coating on said carrier.

Another aspect of this invention relates to a solid affinity support having an attached ligand or binder for the ligand comprising:
  (a) a chemically inert solid perfluorocarbon polymer carrier;
  (b) a crosslinked hydrophilic polymer coating on said carrier; and
  (c) a ligand or binder for the ligand attached to the surface of the hydrophilic polymer.

Yet another aspect of this invention relates to a process for preparing a hydrophilic perfluorocarbon polymer-based matrix comprising the steps of:
  (a) adsorbing a hydrophilic polymer onto the surface of a perfluorocarbon carrier; and
  (b) crosslinking the hydrophilic polymer using a bifunctional crosslinking agent.

Furthermore this invention relates to a process for preparing a solid support containing an attached ligand or binder for the ligand comprising the steps of:
  (a) adsorbing a hydrophilic polymer onto the surface of a perfluorocarbon carrier;
  (b) crosslinking the hydrophilic polymer using a bifunctional crosslinking agent;
  (c) activating the surface of a crosslinked hydrophilic polymer coated perfluorocarbon based-polymer to allow for attachment of a ligand or binder for the ligand to its surface; and
  (d) attaching a ligand or binder for the ligand to the surface of the activated hydrophilic polymer.

Yet another aspect of this invention relates to a bioaffinity separation process comprising the steps of:
  (A) forming a solid affinity support by
    (a) adsorbing a hydrophilic polymer onto the surface of a perfluorocarbon carrier;
    (b) crosslinking the hydrophilic polymer using a bifunctional crosslinking agent; and
    (c) activating the surface of the crosslinked hydrophilic polymer coated perfluorocarbon based-polymer to allow for attachment of a ligand or binder for the ligand to its surface; and
    (d) attaching a ligand or binder for the ligand to the surface of the activated hydrophilic polymer; and
  (B) capturing a binder or ligand for the binder, complementary to the ligand or binder attached to the carrier from a mixture using said solid affinity support.

This invention further relates to an immobilized enzyme system comprising:
  (a) a chemically inert solid perfluorocarbon polymer carrier;
  (b) a crosslinked hydrophilic polymer coating on said carrier; and
  (c) an enzyme attached to the surface of the hydrophilic polymer.

BRIEF DESCRIPTION OF THE FIGURES

The novel features of this invention as well as the invention itself, both as to its organization and method of operation, will best be understood, from the following description, when read in connection with the accompanying drawings, in which like reference numerals refer to like parts in which.

DETAILED DESCRIPTION OF THE INVENTION

Figure 1:
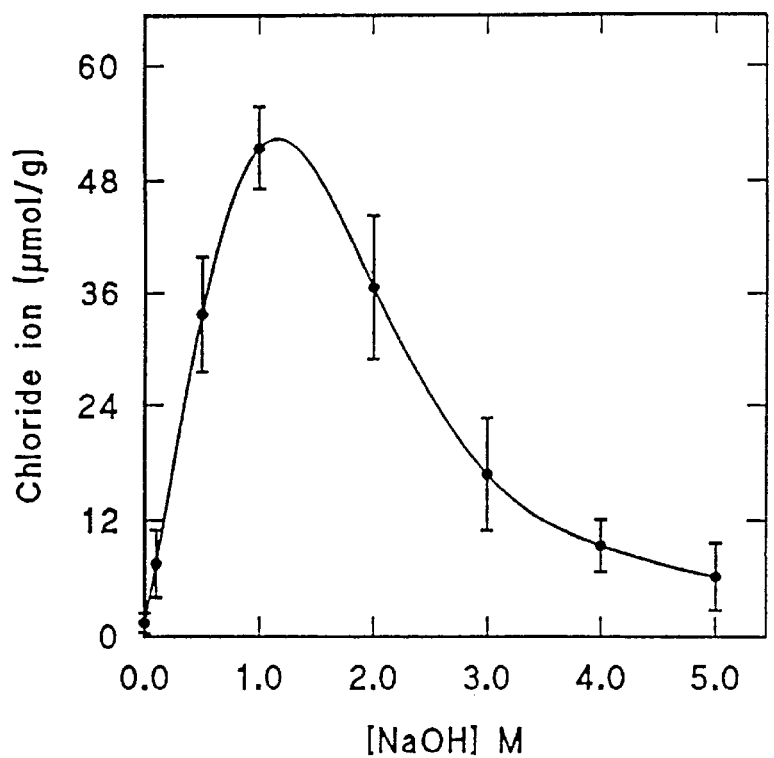
FIG. 1 is a graph which shows the effect of NaOH in the prewash on the incorporation of cyanuric chloride into crosslinked poly vinyl alcohol coated perfluorocarbon polymer-based matrix.

The instant invention is based on the surprising and unexpected finding that when a hydrophilic polymer, such as polyvinyl alcohol is coated or adsorbed onto a perfluorocarbon polymer-based carrier and subsequently crosslinked using a bifunctional crosslinking agent, the resulting hydrophilic coating is sufficiently strong to provide for a stable matrix which can withstand the various washing steps and other operations typically employed in various biotechnology applications, such as bioaffinity separations using membranes and affinity chromatographic separations. The matrices and supports of the present invention are stable in aqueous environments and exhibit low nonspecific binding to proteins, nucleic acids, and other components of biological samples to surfaces.

By perfluorocarbon is meant a molecule which contains the largest possible or a relatively large proportion of fluorine atoms in its structure. Perfluorocarbon polymers are known to be inert. Some perfluorocarbon polymers which can be used for the solid affinity matrices and supports of this invention are various TeflonR fluorocarbon polymers, polytetrafluoroethylene, polyvinylfluoride, and polyvinylidene difluoride. (TeflonR is a registered trademark of E. I. du Pont de Nemours and Company).

By hydrophilic polymer is meant an uncharged, hydrophilic, water soluble non-cyclic polymer having a multiplicity of hydroxyl groups sufficient for crosslinking the polymer molecules to adjacent like molecules (intermolecular crosslinking) so that the crosslinked hydrophilic polymer coating on the perfluorocarbon carrier is sufficiently strong and chemically stable to withstand the various operations and operating conditions typical of biotechnology processing steps, such as various washing steps used in affinity and membrane separations. Preferably the hydrophilic polymer has at least one hydroxyl group, such as a primary or secondary hydroxyl group, available for crosslinking for every six carbons atoms per polymeric unit. Further, the hydrophilic polymer preferably has at least one site, such as a terminal hydroxyl group, available for binding to a ligand or binder for the ligand. Preferably the hydrophilic polymer is a straight chain hydrophilic polymer having one hydroxyl group for every three or fewer carbon atoms per polymeric unit. Polyvinyl alcohol having a molecular weight of from around 8,000 to around 15,000 is particularly preferred. Polymers which are not useful as hydrophilic polymers include agarose, dextran, polyethylene glycol, polyethyleneimine, and starch. The molecular weight range which can be used for the hydrophilic polymer is 1,000 to the point of insolubility in water, generally around 20,000.

Polyvinyl alcohol (PVA) is the preferred hydrophilic polymer which can be used as a coating for the perfluorocarbon carrier used to prepare the matrix and support of the present invention. Polyvinyl alcohol is based on the repeating polymeric structure

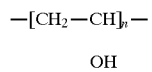

where n is the number of repeating polymeric units.

By bifunctional crosslinking agent is meant a compound having sites capable of covalently binding with the hydroxyl groups of the hydrophilic polymer to effect an intermolecular crosslinking of the hydrophilic polymer molecules. For example, sites which are capable of reacting with the hydroxyl group include —COCl, COBr, —NCO, and CHO. By bifunctional is meant the presence of two sites on the crosslinking agent which can react with the hydroxyl groups of the hydrophilic polymer. In a homobifunctional crosslinking agent two sites on the crosslinking agent which can react with the hydroxyl groups of the hydrophilic polymer are the same. Such crosslinking agents which can react with hydroxyl groups are well known (see for example, U.S. Pat. No. 4,101,380 issued Jul. 18, 1978 to Rubinstein et al., hereby incorporated by reference). Suitable crosslinking agents which can be used to crosslink PVA to itself include dialdehydes such as glutaraldehyde, and diisocyanates such as toluene diiisocyanate. Homobifunctional crosslinking agents are preferred and dialdehydes are the preferred crosslinking agents for PVA.

The hydrophilic polymer coated perfluorocarbon-based polymer matrix of the present invention can be used to prepare solid affinity supports having attached to their surfaces ligands or binders for the ligand; such supports are useful in performing affinity separations.

By ligand is meant an antigen, hapten, nucleic acid, enzyme substrate, vitamin, dye, or other small organic molecule including enzyme effectors, and inhibitors, and by binder is meant an antibody, enzyme, nucleic acid, binding protein, synthetic mimics of binding proteins such as polylysine and polyethyleneimines or other biomolecules capable of specific binding, enzyme/substrate etc. interactions.

The method for preparing the hydrophilic polymer coated perfluorocarbon polymer-based matrix of the present invention involves adsorbing or coating the hydrophilic polymer onto the surface of the perfluorocarbon carrier. Preferably, the perfluorocarbon carrier is initially wetted with a water miscible organic solvent such as acetone or tetrahydrofuran (THF). This is described by U.S. Pat. No. 5,158,880 issued on Oct. 27, 1992 hereby incorporated by reference. The hydrophilic polymer, such as polyvinyl alcohol is then mixed with the carrier in an amount sufficient to coat the carrier and adsorption is allowed to proceed under controlled time, temperature and pH conditions. A crosslinking agent is then added to allow the hydrophilic polymer to crosslink with like molecules. Preferably a dialdehyde such as terephthaldehyde is used to crosslink the preferred hydrophilic polymer polyvinyl alcohol. Generally, the crosslinking reaction is allowed to proceed under controlled time, temperature and pH conditions. The use of crosslinking agents and appropriate reaction conditions for their use are well known in the art (see for example, U.S. Pat. No. 4,101,380 issued Jul. 18, 1978 to Rubinstein et al., hereby incorporated by reference).

The solid affinity support can be formed by activating the hydrophilic surface of the matrix under controlled time, temperature and pH conditions, so that the activated surface can covalently attach ligands or binders for the ligands. Such activation methods are well known in the art. Examples of such activation methods are described by Stewart, D. J., Immobilization of Triazine Dyes On Inert Hydrophobic Supports For Affinity Chromatography, Thesis for the degree of Doctor of Philosophy, University of Cambridge, Kings College (1989), hereby incorporated by reference. Activation allows for the covalent attachment of any site on a ligand or binder for the ligand, such as the —NH$_2$, or —COOH of proteins, via the hydroxyl groups, preferably the terminal hydroxyl groups, of the hydrophilic polymer coating. Where the preferred hydrophilic polymer, PVA is used, the PVA can be activated by the addition of cyanuric chloride.

Subsequent to activation the ligand or binder for the ligand is attached to the solid hydrophilic polymer coated perfluorocarbon-based polymer matrix to form a solid affinity support by covalent attachment. Means for covalently attaching ligands or binders for ligands to appropriately activated supports and means for optimizing such covalent attachment are known in the art. For example various methods for the covalent attachment of ligands methods are described by Stewart, D. J., Immobilization of Triazine Dyes On Inert Hydrophobic Supports For Affinity Chromatography, thesis for the degree of Doctor of Philosophy, University of Cambridge, Kings College (1989), hereby incorporated by reference.

The solid hydrophilic coated perfluorocarbon polymer-based matrix of the present invention can be used in a wide variety of applications. For example the matrix can be used as a substrate for perfluorocarbon-based polymer electronic circuit boards. A perfluorocarbon based polymer can be coated with a hydrophilic polymer such as PVA and treated so as to deposit various conductive meterials, such as metals on its surfaces. In one application PVA can be adsorbed onto a perfluorocarbon polymer-based support which has been previously treated with photo-resist and exposed to ultra-violet light, so as to define desired electrical paths. The PVA coated perfluorocarbon matrix can be dipped into a solution of dissolved silver nitrate (the silver nitrate can be dissolved by the addition of dilute ammonia), and and a few drops of a reducing agent such asformaldehyde added, until the silver is deposited in the support. The matrix of the present invention can also be used for various applications as wettable polymeric films or powders. The matrix of the present invention can also be used as a substrate for the application of colored dyes and as a substrate which can be printed on.

The supports of the present invention can also be used in immunoassays. One such assay is a qualitative enzyme linked immunosorbent assay (ELISA) in which color can be visually detected on the surface of filter paper or other surfaces. Detectable signals other than color can also be used.

Yet another application is in the construction and use of immobilized enzyme systems such as enzyme electrodes by immobilizing enzymes onto hydrophilic polymer coated solid perfluorocarbon based polymer matrices. In this application an enzyme can be bound to a perfluorocarbon membrane of an electrochemical gas sensor. The enzyme is chosen so as to be able to catalyze a reaction which generates a product or consumes coreactant which can be monitored electrochemically. The electrochemical signal provides a measure of the analyze concentration. In this application, the enzyme acts as the binder and the target analyze as the ligand.

EXAMPLE

Adsorption of polyvinyl alcohol (PVA) on fluoropolymer particles

One hundred grams of perfluorocarbon particles (6–8 $m^2/g$, mean particle size 70 microns obtained from E. I. Du Pont de Nemours and Company, Wilmington, Del.) were stirred overnight in 500 ml tetrahydrofuran and then washed in 500 ml acetone on a glass sinter (grade 2) filter. The remaining acetone was drained under gravity leaving the particles still wet with acetone and unexposed to air. The resulting translucent material was added to a stirred solution of aqueous 0.7 mM polyvinyl alcohol (PVA) (MW 14,000, 100% hydrolyzed) (Aldrich Co., Gillingham, Dorset, UK)and the PVA was allowed to adsorb for 5 hours at 20 degrees C., after which time 50 ml of 70 mM aqueous terephthaldehyde (Aldrich, Gillingham, Dorset, UK) was added. The mixture was acidified by the addition of 20 ml of 5M HCl and after 4 hours of crosslinking, the material allowed to settle and the supernatant decanted off. The resulting crosslinked polyvinyl alcohol coated perfluorocarbon matrix was washed on a sintered glass filter consecutively with 2 liters of water, 2 liters of hot water at 60 degrees C, 2 liters) and 2 liters of distilled water.

The amount of PVA adsorbed to the support was determined by difference analysis of the supernatant using a specific PVA assay described by Zwick, M. M. J. Appl. Polm. Sci., 9,p. 2393 (1965), hereby incorporated by reference. It was found to be approximately 20 mg PVA per 1 g perfluorocarbon carrier.

Activation of the Crosslinked PVA Coated Perfluorocarbon Polymer-Based Matrix And Optimization of the Activation Process Samples of 0.5 grams (g) crosslinked PVA coated perfluorocarbon polymer-based matrix having 20 mg PVA/g perfluorocarbon carrier and prepared as described above was incubated in a series of aqueous sodium hydroxide (NaOH) solutions of 0.0, 0.1, 0.5, 1.0, 2.0, 3.0, 4.0, and 5.0M for 1 hour. The resulting material was then filtered using a sintered glass filter and added to 5 milliliters (ml) of 20mM cyanuric chloride (Aldrich, Gillingham, Dorset, UK) in acetone for 10 minutes at 20 degrees C. The resulting activated material was washed consecutively, avoiding exposure to air, with acetone, acetone/water (50:50 v/v) and water prior to evaluating the number of reactive groups coupled. The extent of activation ($\mu$m Cl-/g activated material) was determined by hydrolyzing 0.1 g of reactive material in 3 ml of 0.1M NaOH for 1 hour at 20° C., and assaying the chloride ions liberated using a method described by Vogel, A. I., Textbook of Quantitative Inorganic Analysis", 1978, Longman Inc., N.Y., pp.754, hereby incorporated by reference.

Activation resulted in linking some of the secondary hydroxyl groups of the PVA with cyanuric chloride.

FIG. 1 is a graph which shows that a concentration of 1M NaOH in the prewash was optimal for introducing reactive cyanuric chloride groups into the matrix. Reactivity of the activated material fell at higher concentrations of alkali because stronger base either hydrolyzed the coupled cyanuric chloride or caused more extensive cross-linking of the PVA coating. Conversely, the use of a lower concentration of NaOH reduced the hydrolysis of cyanuric chloride groups on the adsorbent and thus minimized the introduction of possible non-specific adsorption sites.

Five grams (g) of crosslinked PVA coated perfluorocarbon polymer-based matrix having 20 mg PVA/g perfluorocarbon carrier and prepared as described above was incubated in 50 ml of 1M aqueous sodium hydroxide (NaOH) for 1 hour. The resulting material was then filtered using a sintered glass filter and 0.5 g samples of the material were added to a series of 5 ml aqueous solutions containing from 0.0 to 0.1 cyanuric chloride in acetone for 10 minutes at 20 degrees C. The concentrations of cyanuric acid used are shown graphically in FIG. 2. The resulting activated material was washed consecutively, avoiding exposure to air, with acetone, acetone/water (50:50 v/v) and water prior to evaluating the number of reactive groups coupled. The extent of activation ($\mu$m Cl-/g activated material) was determined as described above.

Figure 2:
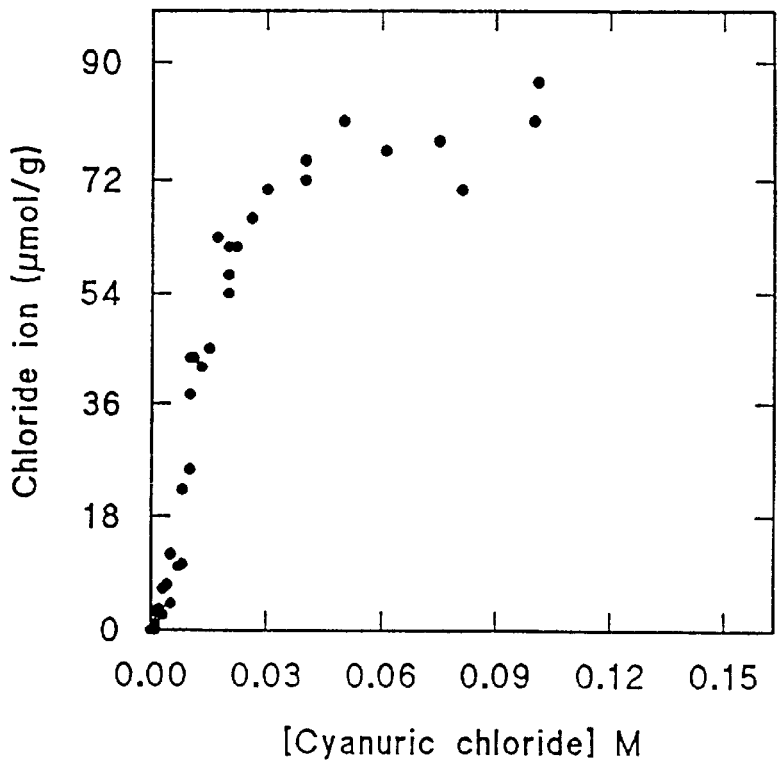
FIG. 2 is a graph which shows the effect of cyanuric chloride concentration on the activation of crosslinked poly vinyl alcohol coated perfluorocarbon polymer-based matrix.

FIG. 2 is a graph which shows the effect on the reactivity of the material of increasing the cyanuric chloride concentration while using 1M NaOH as the optimum prewash condition. The extent of activation increased linearly to a pseudo-plateau at approximately 70 $\mu$m Cl-/g, demonstrating that the level of reactivity of the support could be easily controlled. A concentration of 10 mM cyanuric chloride produced a support containing 20 $\mu$m Cl-/g material.

Under the above described conditions, the activation reaction was very rapid, with maximum activation occurring within minutes of adding the alkaline support to the cyanuric chloride.

Figure 3:
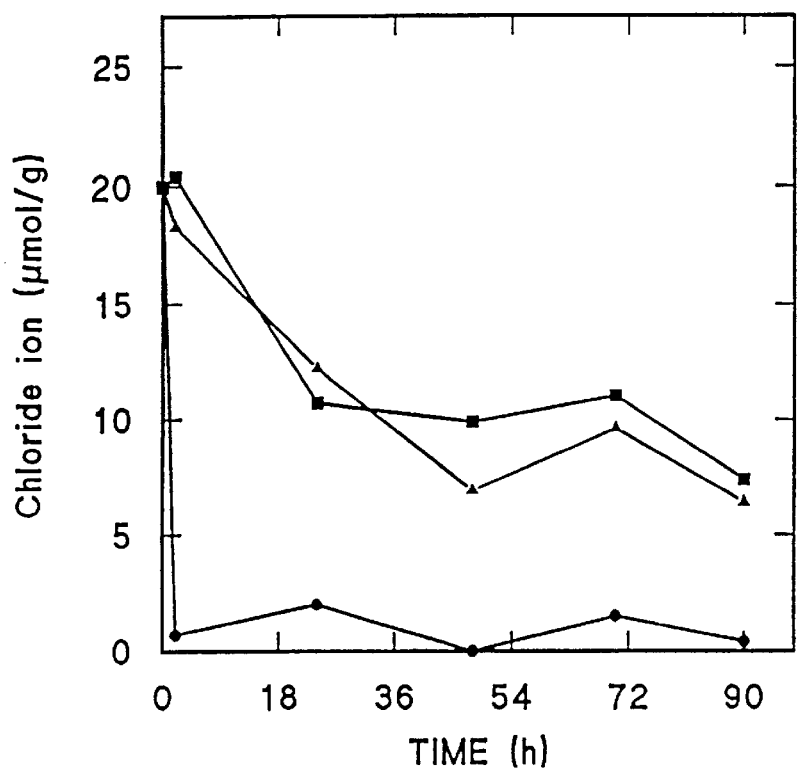
FIG. 3 is a graph which shows the effect of storage of activated crosslinked poly vinyl alcohol coated perfluorocarbon polymer-based material under three different conditions: 0.1M NaOH (circle), 0.1M sodium phosphate buffer pH 7.0 (triangle), and 0.1M acetic acid (square).

FIG. 3 is a graph which shows the stability of the activated material under various conditions. One gram of reactive material of 20 μm Cl-/g activated material prepared as described above was stored at 20 degrees under three different conditions: in 0.1M NaOH, in 0.1M sodium phosphate buffer pH 7.0, and 0.1M acetic acid. The coupled reactive groups were immediately hydrolyzed in 0.1M NaOH but retained at least half of their reactivity in 0.1M acetic acid and 0.1M sodium phosphate buffer pH 7.0 for up to one week.

A sample of the activated material prepared as described above was stored at 4° C., after freeze drying in 10% (v/v) acetic acid and showed no apparent loss of reactivity, as measured using the procedure described herein, after 3 months of storage.

Preparation of Affinity Supports Having HSA, IgG and Cocanavalin A Attached to Their Surfaces Protein Determination Assay Activated material prepared as described above and containing 20 μmol Cl-/g activated material or 0.2 g of hydrolyzed material was added to human serum albumun (HSA) (Cohn Fraction V, Sigma Co. Poole, Dorset (4 mg/2 ml) in 0.1M phosphate buffer pH 7.0. The coupling reaction was terminated after 1 hour and the amount of HSA immobilized determined spectrophotometrically by difference.

The amount of protein was determined with the Pierce Coomassie protein assay reagent (1.0 ml.) (Pierce, Luton, Beds, UK) added to appropriate serial dilutions of the protein solution (20 μl). After mixing and standing at room temperature for 10 minutes, the absorbance at 595 nm was measured. Standard curves for human serum albumin (HSA), human immunoglobulin G (IgG) (donated by PMLS, Porton Down, Wiltshire, UK) and concanavalin A (Con A) were prepared. Protein concentrations in stock solutions were initially determined by absorbance at 280 nm, assuming A280 nm 1% (w/v) 5.8, 14.7, (Nakamura, K., Hashimoto, T., Kato, Y., Shimuran, K. and Kasai, K.-I., J. Chromatogr., 510 (1990) 101.) and 1.1 (Borchert, A., Larsson, P.-O. and Mosbach, K., J. Chromatogr., vol. 244, 1982, p. 49.) for HSA, IgG and Con A, respectively and A275 nm 1% (w/v) was 1.65 for Protein A (Langone, J. J., Adv. Immunol., vol. 32, 1982, 157).

Figure 4:
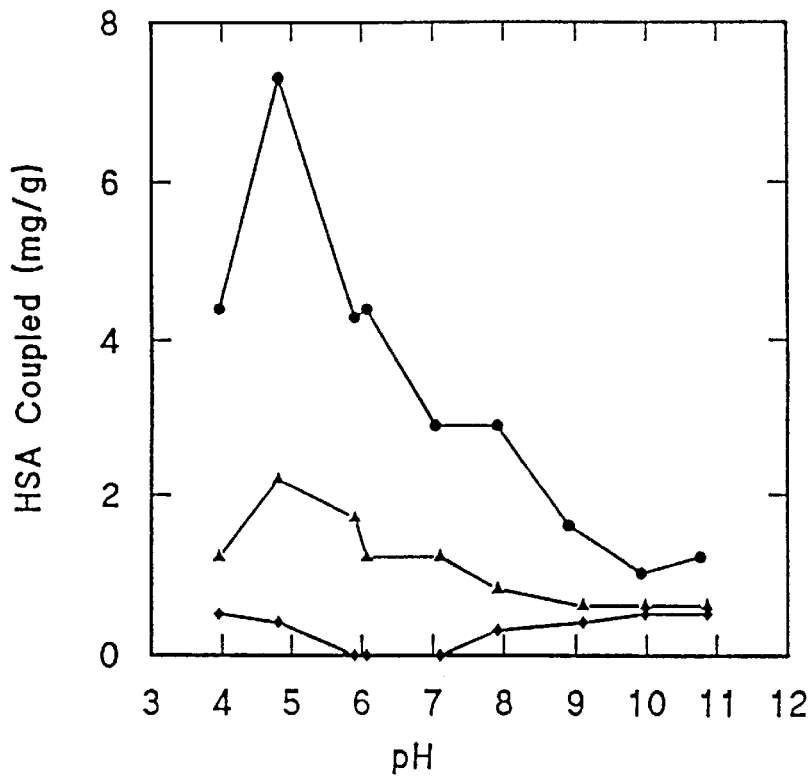
FIG. 4 is a graph which is a graph which shows the effect of pH on the attachment of human serum albumin (HSA) onto the surface of activated crosslinked poly vinyl alcohol coated perfluorocarbon polymer-based material. Shown are: Activated support (circle), activated support hydrolyzed with 0.1M ethanolamine (triangle), and crosslinked poly vinyl alcohol coated perfluorocarbon polymer-based matrix (diamond).

FIG. 4 is a graph which shows the coupling of human serum albumin (HSA) to the activated support at different pH values. Maximum immobilization of HSA (8 mg./g.) occurs at pH 5, while at higher pH values less protein is immobilized, possibly due to the higher solubility of HSA or to solvolysis of the reactive cyanuric chloride groups. Markedly less protein was immobilized onto control materials which were cyanuric chloride-activated material prepared as described above but further hydrolyzed with 0.1M ethanolamine, at pH 9.0 overnight at 20° C. and even less to the cross-linked PVA-coated perfluorocarbon polymer-based matrix preared as previously described herein.

Figure 5:
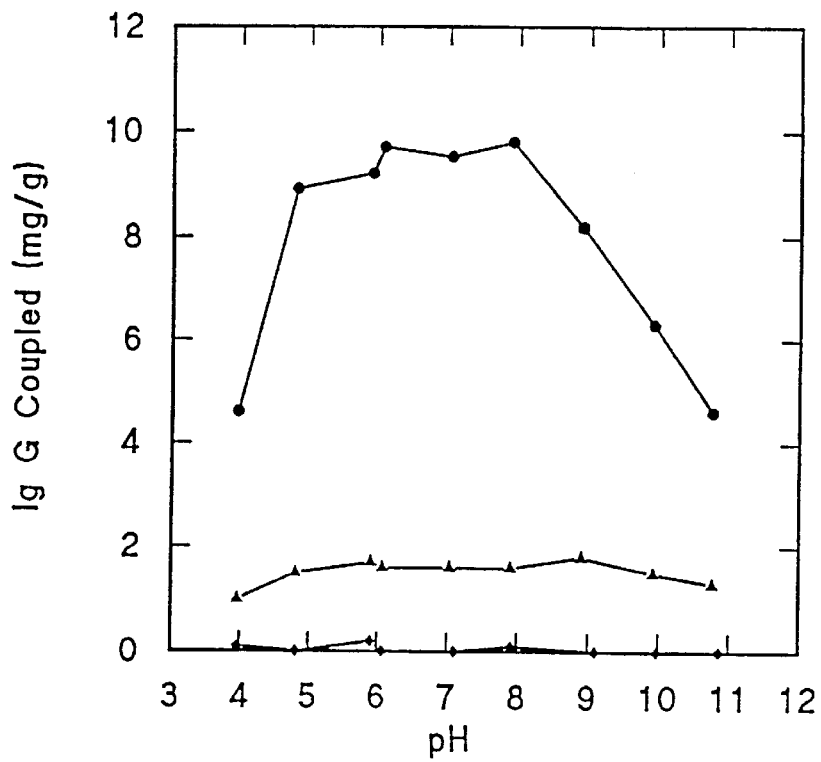
FIG. 5 is a graph which shows the effect of pH on the attachment of human IgG onto the surface of activated crosslinked poly vinyl alcohol coated perfluorocarbon polymer-based material. Shown are: Activated support (circle), activated support hydrolyzed with 0.1M ethanolamine (triangle), and crosslinked poly vinyl alcohol coated perfluorocarbon polymer-based matrix (diamond).

FIG. 5 is a graph which shows the results of similar studies with the coupling of IgG at pH values 4–11. The same coupling conditions were used as previously described for the coupling of HSA. A broad optimum capacity of 10 mg. IgG/g material was obtained in the pH range 5–8. However, immobilization of IgG at higher pH values, especially when compared to HSA, was probably related to decreased protein solubility, which encouraged interaction with the reactive support prior to solvolysis. Hydrolysis of the activated support with ethanolamine under the same conditions described above with respect to HSA, reduced the amount of IgG coupled, but not to the very low levels observed for adsorption of protein to PVA-coated perfluorocarbon polymer-based matrix prepared as previously described herein.

Figure 6:
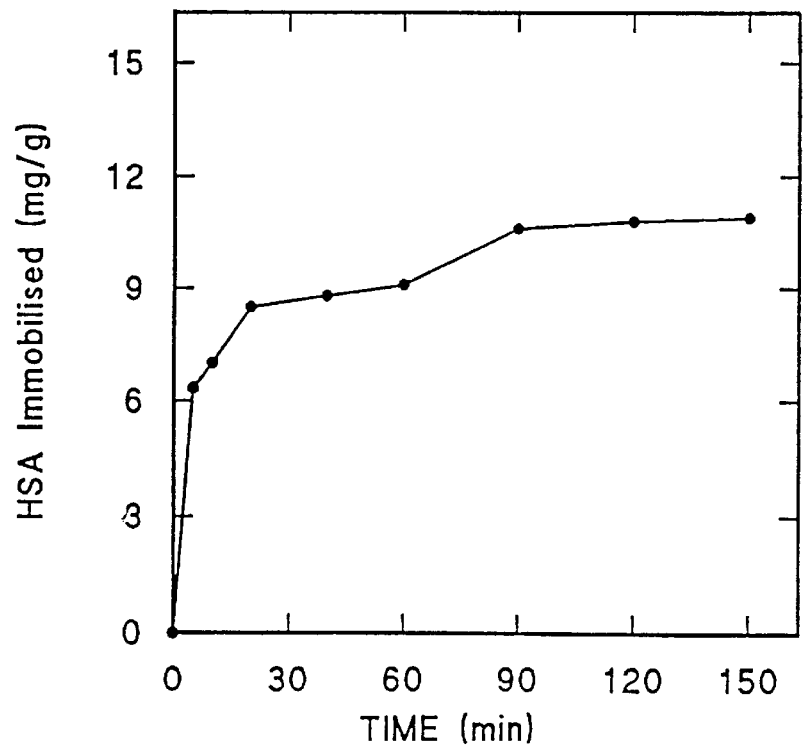
FIG. 6 is a graph which shows a time course for the attachment of HSA onto the surface of activated crosslinked poly vinyl alcohol coated perfluorocarbon polymer-based material.

FIG. 6 is a graph which shows that at pH 5.0 and 20° C., approximately 60% of added albumin is coupled to the activated support within 5–10 min. with maximum immobilization achieved after 2 hours. An amount of 0.2 g of activated material was separately added to samples of HSA (4 mg/2 ml) in 0.1M acetate buffer at pH 5.0. Coupling was terminated at time intervals and the amount of immobilized or attached HSA was determined by assay of the supernatant. The high reactivity of the active cyanuric chloride groups facilitates rapid immobilization of biochemicals to the support in aqueous media and at physiological pH.

Figure 7:
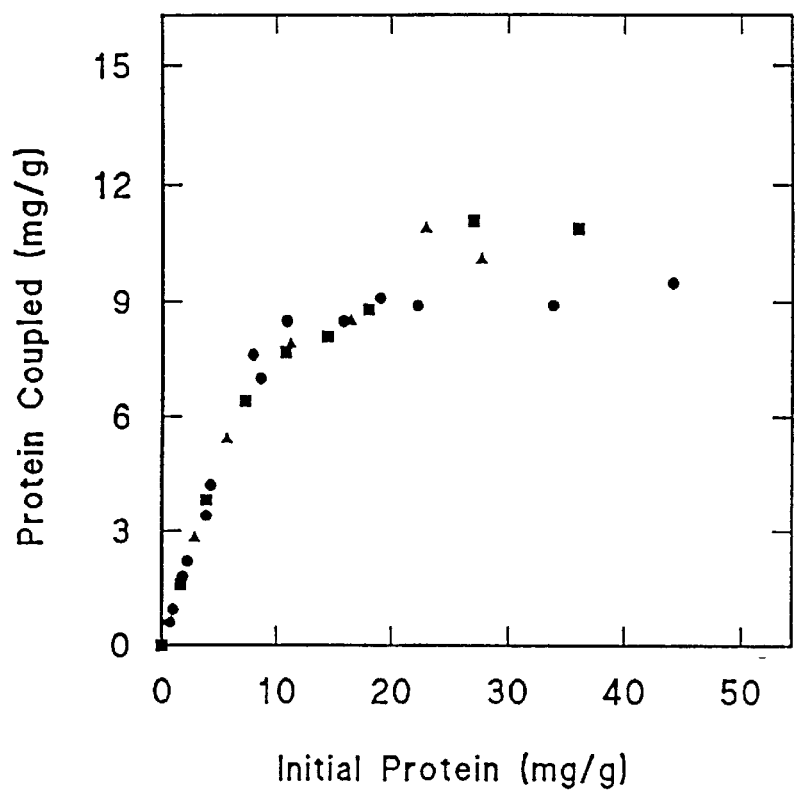
FIG. 7 is a graph which shows isotherms for coupling HSA (circle), IgG (triangle), and Concanavalin A (square) to activated crosslinked poly vinyl alcohol coated perfluorocarbon polymer-based material.

FIG. 7 is a graph which shows that HSA, IgG and concanavalin A all exhibit similar isotherms (2 ml solutions of increasing concentrations were incubated with cyanuric activated material [0.2 g, 20 μmol Cl-/g) in 0.1M acetate buffer pH 5.0 for 2 hours] with optimum coupling of approximately 8–10 mg./g. activated material and coupling yields of approximately 80%, even at relatively low protein concentrations. All of the proteins were immobilized with a surface coverage of approximately 1.4 mg./m$^2$., a figure characteristic for protein adsorption (see for example, Andrade, J. D. and Hlady, V., Adv. Polym. Sci., vol. 79, 1986, 12). This observation suggests that the coupled proteins form a densely packed monolayer on the surface, although, in general, dense packing should be avoided in order to alleviate possible steric hindrance involved when binding the affinity molecule. This achievement of the maximum amount of protein immobilization may not be conducive to the production of efficient affinity adsorbents, where optimum protein surface densities may need to be determined experimentally.

Chromatographic Separation of Horse Radish Peroxidase on A Concanavalin A Solid Affinity Support The solid affinity supports as prepared below were equilibrated in a relevant buffer and packed in Pharmacia HR 5/10 columns at a flow rate of 5 ml./min. and used in conjunction with a Pharmacia FPLC system comprising a P500 pump, LCC 500 plus controller, UV-I single path monitor and LKB 2212 Helirac fraction collector.

Concanavalin A (lectin) was coupled to the activated material and tested for their ability to purify horse radish peroxidase (HRP).

A concanavalin A affinity support was prepared by coupling the lectin in the presence of alpha-methyl-D-glucopyranoside (Sigma, Poole, Dorset, UK) in 0.5M acetate, 0.5M NaCl, 1 mM CaCl$_2$, 1 mM MnCl$_2$, pH 5.1 (coupling buffer) for 2 hours. Before use the material was washed with coupling buffer and stirred in 0.1M ethanolamine pH 9.0 for 48 hours at 4° C.

A concanavalin A affinity support was synthesized by coupling the lectin in the presence of alpha-methyl-D-glucopyranoside in 0.05M acetate, 0.5M NaCl, 1 mM CaCl$_2$, 1 mM MnCl$_2$, pH 5.1 for 2 h. Before use, the material was washed with coupling buffer and stirred in 0.1M ethanolamine pH 9.0 for 48 h. at 4° C.

A crude horse radish peroxidase (HRP) (Sigma, Poole, Dorset, UK) preparation was applied to the Concanavalin A affinity support (FIG. 8A) and, after washing off unbound protein, the adsorbed HRP was specifically eluted with the competing glycopyranoside. The RZ ratio (Absorbance at 405 nm/Absorbance at 280 nm) of the eluted fraction of 2.2 corresponded to a 5.6-fold purification of the crude material with 80% overall recovery.

Figure 8:
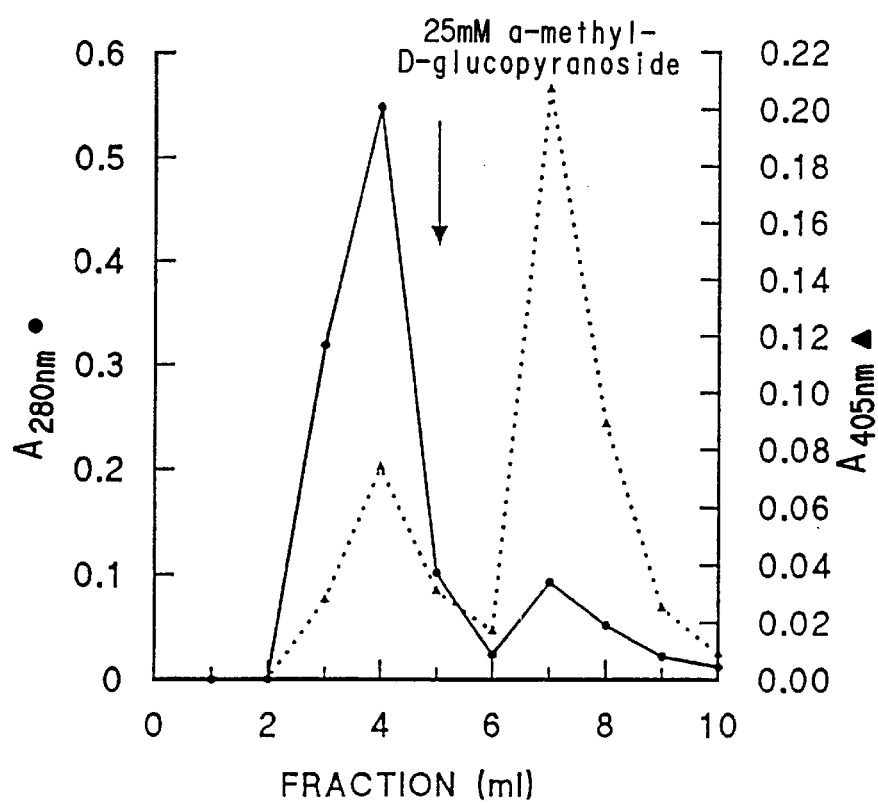
FIG. 8 is a graph which shows the purification of horseradish peroxidase (HRP) using a Concanavalin A solid affinity support.

With respect to FIG. 8, the column employed was 0.5×10 cm, contained 3.6 mg Concanavalin A/ gram support, and 70 μm perfluorocarbon carrier. Column conditions were as follows: mobile phase 0.05M acetate, 0.5M NaCl, 1 mM CaCl$_2$, (FSA, Loughborough, Leics, UK) 1 mM MnCl$_2$, pH 5.1; flow rate: 1 ml/minute; sample was injected at 1 minute, 1 ml crude HRP (5 mg/ml); elution buffer: 25 mM alpha-methyl-D-glucopyranoside in mobile phase (3 ml) injected at 5 minutes; fractions (1 ml) were assayed at 280 nm and 405 nm.

Chromatographic Separation of Human IgG on A Protein A Solid Affinity Support

Protein A (purified from cell walls of *Staphylococcus aureus*, Cowan strain, Sigma Co., Poole, Dorset, UK) was coupled to an cyanuric chloride activated perfluorocarbon polymer-based activated matrix having 4.6 μmol Cl-/g activated matrix using the coupling procedure described above. After deactivation of excess reactive groups with ethanolamine, plasma (obtained from a known donor at the National Blood Transfusion Center, Nottingham, UK) was applied to the gel in order to purify IgG (FIG. 9A). The fraction eluted with 0.1M citrate pH 3.0 contained 0.9 mg. IgG, a capacity equivalent to other supports (see for example, Fuglistaller, J. Immunol. Meth., vol. 124, 1989, p. 171).

Application of a pure sample of IgG gave a similar capacity with 80% recovery of the affinity adsorbed proteins.

Figure 9:
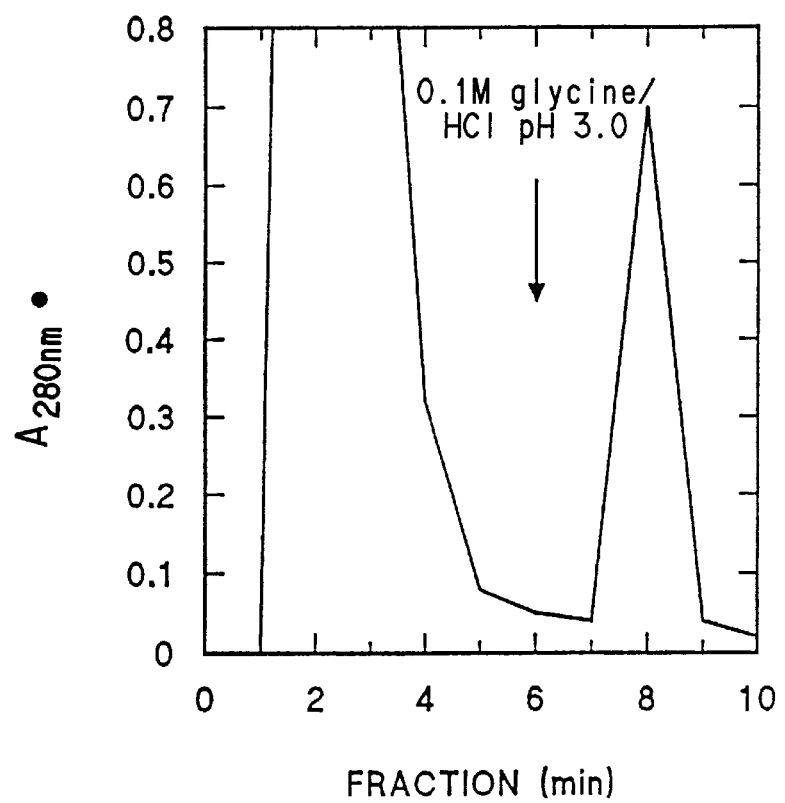
FIG. 9 is a graph which shows the purification of IgG from human plasma using a Protein A solid affinity support.

With respect to FIG. 9, the column employed was 0.5×10 cm, contained 0.7 mg Protein A/ gram support, and 70 micro-m perfluorocarbon carrier. Column conditions were as follows: mobile phase 0.1M Na2HPO4 buffer pH 8.0; flow rate: 2 ml/minute; sample was injected at 1 minute 1 ml human plasma; elution buffer: 0.1M citrate pH 3.0 (3 ml) injected at 6 minutes; fractions (2 ml) were assayed at 280 nm.

What is claimed is:

1. A method for making adsorbent particles comprising the sequential steps:

(1) dispersing porous particles of inert perfluorocarbon polymer in water-miscible organic solvent to wet the surfaces of the porous particles;

(2) separating the porous perfluorocarbon polymer particles, the surfaces of which are wetted with the water-miscible solvent, from the water-miscible solvent in the dispersion from step (1);

(3) forming a dispersion of the miscible solvent-wetted perfluorocarbon polymer particles from step (2) in an aqueous solution of hydrophilic polymer having a molecular weight of at least 1,000 up to the point of insolubility of the polymer in water, the chains of the polymer containing a plurality of hydroxyl groups at least one of which is located at an end of a polymer chain, by which the hydrophilic polymer is adsorbed onto the wetted surfaces of the perfluorocarbon polymer;

(4) admixing a homobifunctional cross-linking agent with the dispersion from step (3) to effect cross-linking of the adsorbed hydrophilic polymer adsorbed on the surfaces of the fluorocarbon polymer;

(5) separating the cross-linked hydrophilic polymer-coated particles from the dispersion from step (4);

(6) activating hydroxyl groups on the surface of the cross-linked hydrophilic polymer to provide for covalent bonding thereto of a ligand or ligand binder; and (7) covalently bonding a ligand or ligand binder to the activated hydroxyl groups on the surface of the hydrophilic polymer.

2. The method of claim 1 in which the hydrophilic polymer is poly(vinyl alcohol).

3. The method of claim 1 in which the water-miscible organic solvent is selected from the group consisting of acetone and tetrahydrofuran.

4. The method of claim 1 in which the homobifunctional crosslinking agent contains groups capable of covalent bonding selected from —COCl, —COBr, —NCO and —CHO.

5. A bioaffinity separation process comprising capturing a binder or ligand binder complementary to the binder or ligand binder attached to an adsorbent particle made by the method of claim 1.

6. An adsorbent matrix made by the method of any of claims 1–4.

* * * * *

UNITED STATES PATENT AND TRADEMARK OFFICE
CERTIFICATE OF CORRECTION

PATENT NO   :   5,773,587
DATED       :   JUNE 30, 1998
INVENTOR(S) :   CHRISTOPHER ROBIN LOWE, NORMAN A. PARRIS,
                IAN PITFIELD AND DUNCAN ROSS PURVIS

It is certified that error appears in the above-identified patent and that said Letters Patent is hereby corrected as shown below:

PLEASE CHANGE THE ASSIGNEE FROM "DVC, INC." to -- DCV, INC. --

Signed and Sealed this

Sixteenth Day of November, 1999

Attest:

Q. TODD DICKINSON

Attesting Officer       Acting Commissioner of Patents and Trademarks